United States Patent [19]

Nolen et al.

[11] 4,319,433
[45] Mar. 16, 1982

[54] TOOL FOR CUTTING AUTOMOTIVE COMPONENTS

[75] Inventors: Robert K. Nolen, Chicago; David J. Leehaug, West Chicago, both of Ill.

[73] Assignee: Maremont Corporation, Chicago, Ill.

[21] Appl. No.: 77,919

[22] Filed: Sep. 24, 1979

[51] Int. Cl.³ .................. B24B 23/02; B24B 55/04; B27B 9/02
[52] U.S. Cl. .................. 51/170 PT; 30/377; 30/295; 51/268
[58] Field of Search .......... 51/170 R, 170 PT, 170 T, 51/268, 272, 269, 271; 30/374, 375, 377, 390, 295, 293, 292, 240, 276, 388; 144/134 D, 136 C

[56] References Cited

U.S. PATENT DOCUMENTS

| | | | |
|---|---|---|---|
| 2,301,264 | 11/1942 | Emery | 51/170 PT |
| 2,502,656 | 4/1950 | Koett | 30/377 |
| 2,707,854 | 5/1955 | Johnson | 51/170 PT |
| 3,591,989 | 7/1971 | Granlie | 51/170 PT |

FOREIGN PATENT DOCUMENTS

| | | | |
|---|---|---|---|
| 1907372 | 8/1970 | Fed. Rep. of Germany | 144/136 C |
| 795280 | 5/1958 | United Kingdom | 51/268 |
| 457584 | 3/1975 | U.S.S.R. | 51/170 PT |

*Primary Examiner*—Roscoe V. Parker
*Attorney, Agent, or Firm*—Cushman, Darby & Cushman

[57] ABSTRACT

A tool for use in cutting parts of automotive components, such as exhaust systems, shock absorber units and the like, to facilitate removal and replacement of the components. The tool comprises a portable housing of a size and shape to be manually gripped by a user, an air motor within the housing including an output shaft extending generally longitudinally outwardly of one end thereof, a manually actuated trigger for selectively communicating a source of air under pressure with the air motor to operate the same and rotatably drive the output shaft, a thin cutting disc of abrasive material fixed concentrically on the shaft longitudinally in spaced relation with respect to the housing, and a protective shield structure molded of transparent rigid plastic material. The shield structure includes an annular wall portion fixed to the one housing end in longitudinally spaced relation from one side of the cutting disc, a finger guard portion extending longitudinally from the annular wall portion in a direction away from the cutting disc in generally parallel coextensive relation with the housing, a peripheral shield portion extending longitudinally from the annular wall portion in the direction toward said cutting disc beyond the periphery thereof, and an outer wall portion extending generally radially inwardly from the longitudinally outward end of the peripheral guard portion in covering relation with a substantial portion of the cutting disc. An adjustable depth gauge member is also provided.

8 Claims, 5 Drawing Figures

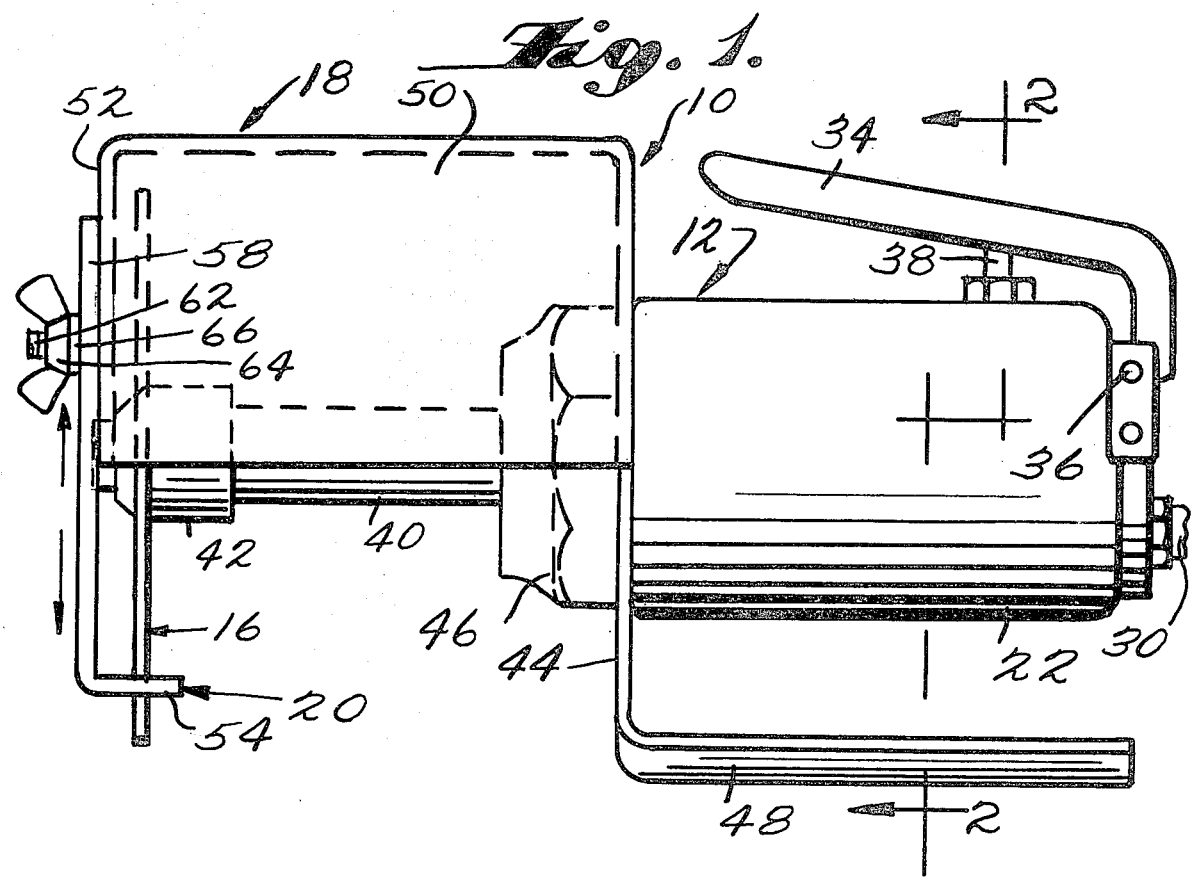
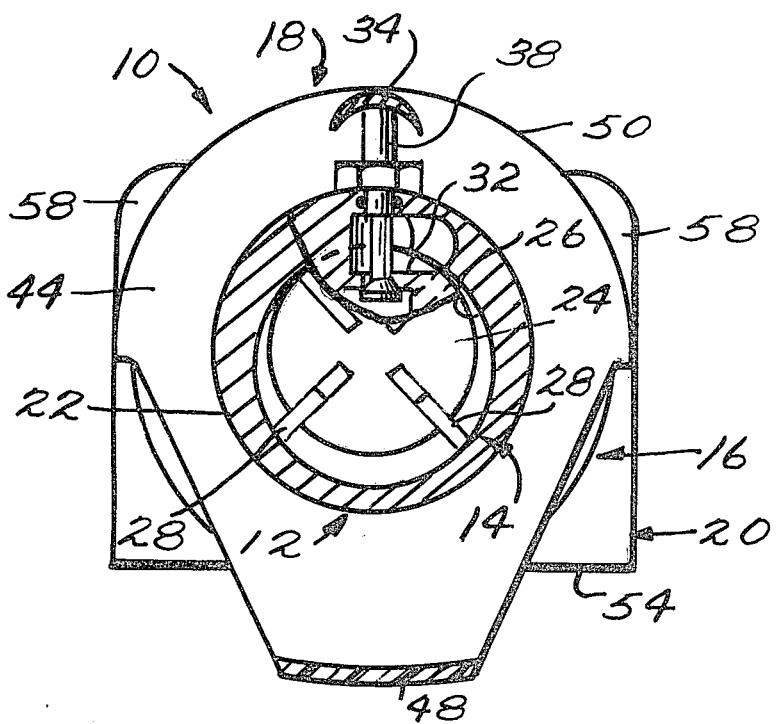

TOOL FOR CUTTING AUTOMOTIVE COMPONENTS

This invention relates to the removal and replacement of automotive components and more particularly to an improved tool for cutting parts of automotive components, such as exhaust systems, shock absorber units and the like, to facilitate removal and replacement of the components.

The removal and replacement of automotive components is often accompanied by difficulties in loosening fasteners due to rust and the like. Often in the case of exhaust system components it is necessary to actually cut away rusted together components in order to effect their removal and replacement. Heretofore there has not been a simple effective tool which would enable this function to be easily accomplished. It is an object of the present invention to provide such a tool.

In accordance with the principles of the present invention, this objective is obtained by providing a tool which includes a portable housing of a size and shape to be manually gripped by a user, an air motor within the housing capable of being driven when connected with the usual source of air under pressure available at automotive part replacement facilities. The air motor includes an output shaft extending generally longitudinally outwardly of one end of the housing and a thin cutting disc of abrasive material is fixed concentrically on the shaft in longitudinally spaced relation with respect to the housing. The tool further includes a protective shield structure molded of plastic material so as to include an annular wall portion fixed to the other end of the housing in longitudinally spaced relation from one side of the cutting disc. The shield structure also includes a finger guard portion extending longitudinally from the annular wall portion in a direction away from the cutting disc in generally parallel coextensive relation with the housing, a peripheral shield portion extending longitudinally from the annular wall portion in the direction toward the cutting disc beyond the periphery thereof and an outer wall portion extending generally radially inwardly from the longitudinally outward end of the peripheral guard portion in covering relation with a substantial portion of the cutting disc. With this arrangement there is provided a tool which can be easily handled by a user which is subject to power operation of the type which is normally provided at an automotive component replacement facility, namely, air under pressure, and an abrasive disc cutting element which achieves a highly efficient and desirable cutting action. Thus, the tool of the present invention provides a highly desirable power operation without the danger incident to the use of electric cords around automotive component replacement facilities, the utilization of this convenient source of power in an easily handled structure for driving a highly efficient cutting element, the arrangement embodying a protective shield structure of simple but effective design.

In a preferred embodiment the tool includes the provision of an adjustable depth gauge member which serves to determine the depth of cut which can be achieved by the thin cutting disc of abrasive material operating under the conventional air pressure source of power.

Accordingly it is a further object of the present invention to provide a tool of the type described which is simple in construction, economical to manufacture and maintain and effective and efficient in operation.

These and other objects of the present invention will become more apparent during the course of the following detailed description and appended claims.

The invention may best be understood with reference to the accompanying drawings, wherein an illustrative embodiment is shown.

In the drawings:

FIG. 1 is a side elevational view of a tool embodying the principles of the present invention;

FIG. 2 is a sectional view taken along the line 2—2 of FIG. 1;

Figure 3:
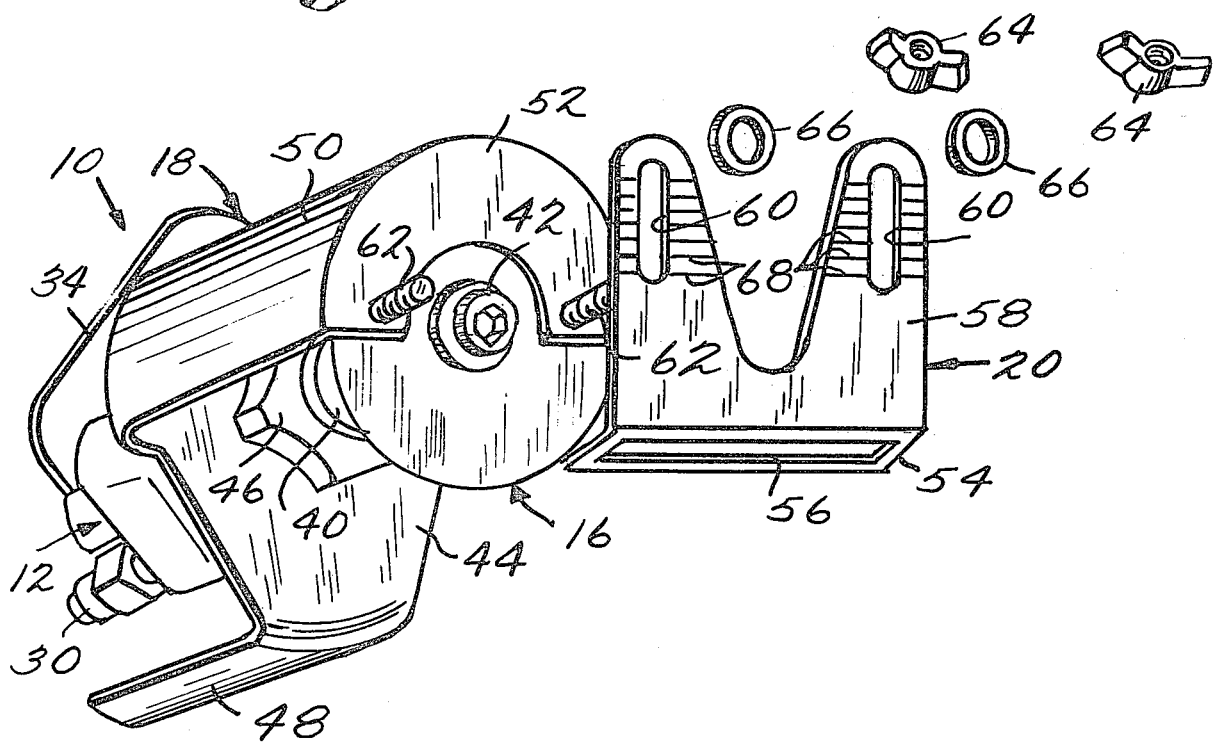
FIG. 3 is a perspective view of the tool with the adjustable depth gauge member and its mounting elements shown in exploded perspective view.
Figure 4:
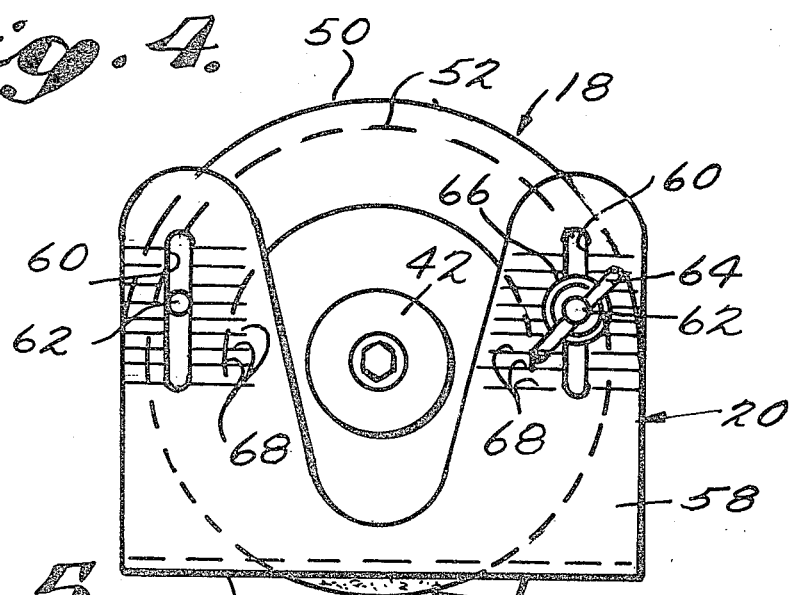
FIG. 4 is a fragmentary end view of the tool viewed from the cutting disc end thereof.
Figure 5:
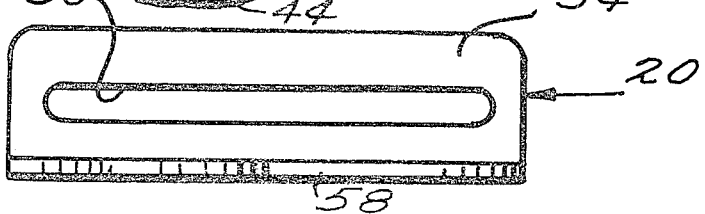
FIG. 5 is a bottom plan view of the adjustable depth gauge member of the tool.

Referring now more particularly to the drawings, there is shown therein a tool, generally indicated at 10, which embodies the principles of the present invention. The tool consists essentially of five major components which include a housing structure, generally indicated at 12; a controllable air motor, generally indicated at 14; a thin cutting disc of abrasive material, generally indicated at 16; a protective shield structure, generally indicated at 18; and an adjustable depth gauge structure, generally indicated at 20.

As shown, the housing 12 is of a size and shape suitable to be manually gripped by a user, rendering the tool 10 portable in nature. As shown, the housing is generally in the form of an elongated cylinder 22 having an exterior diameter and length of a size suitable to be gripped within a single hand of a user. The exterior periphery of the cylinder 22 provides the gripable housing and its interior periphery forms part of the air motor 14. The air motor may assume any conventional design or configuration, however, the exemplary embodiment illustrated in the drawings is a sliding fan type air motor which includes a rotor 24 suitably journaled within the housing for rotational movement about a longitudinally extending axis. As shown, the rotational axis coincides with the axis of the exterior cylindrical periphery of the cylinder 22. The interior of the cylinder 22 is likewise of cylindrical shape, however, the axis is eccentric, as indicated at 26 and of a size such that the rotor periphery touches it at one position. The rotor has a plurality of annularly spaced radially extending slots formed therein within which is slidably mounted a plurality of radially extending vanes 28. In accordance with conventional practice, the edges of the vanes engage the cylindrical interior periphery 26 of the housing 22 and suitable end plates of the housing and divide the interior into variable volume chambers. At the position rotor 24 engages the housing periphery 26, air under pressure is communicated through an appropriate housing inlet in the side wall with the chamber defined immediately adjacent to the position of contact. As shown, the air under pressure is communicated from the source (not shown) to the inlet of the air motor by an air line 30. Air under pressure from the line 30 leads to a main control valve 32 which, when normally biased into a closed position, prevents the air under pressure from entering the rotor inlet. A manual actuated trigger or handle 34 is pivotally mounted on the rearward end of the housing as indicated at 36 and extends longitudinally over an outwardly extending stem 38 of the control valve 32. When the handle 34 is manually depressed in a direction toward the housing 22, valve 32 opens, allowing air under pressure from the hose 30 to enter the inlet chamber of the rotor, thus causing the rotor to turn by virtue of the differential area provided by the sliding vane in accordance with conventional practice. As the rotor turns so as to reach a position beyond that which will extend the vane radially a maximum distance, the air within the associated chamber is allowed to exhaust to atmosphere through a suitable housing outlet in a side wall.

The air motor 14 includes an output shaft 40 which is fixed to the rotor so as to turn therewith and extends longitudinally outwardly from the end of the housing opposite to that at which the handle 34 is connected. The outer end of the shaft 40 includes a fitting 42 adapted to fixedly attach thereto the hub of the cutting disc 16. The cutting disc is relatively thin and is formed of known abrasive material so that when rotated in conjunction with the rotation of the shaft 40 it will accomplish effective and efficient cutting of metal components engaged therewith. The cutting disc is preferably a reinforced carborundum abrasive disc rated at 20,300 rpm.

The protective shield structure is preferably a unitary structure molded of plastic material, preferably a transparent rigid plastic material such as clear Bisphenol-A polycarbonate (e.g. Lexan ®). The shield structure 18 includes an annular wall portion 44 which is suitably apertured to receive the shaft 40 therethrough and is fixedly mounted to the end of the housing from which the shaft 40 extends as by a threaded sleeve or nut member 46. Extending longitudinally from the annular wall portion 44 in a direction away from the cutting disc 16 and in generally parallel coextensive relation with the exterior periphery of the housing at a position diametrically opposed to the position of the handle 34 is a finger guard portion 48.

A peripheral shield portion 50 of generally semi-cylindrical configuration extends longitudinally from the periphery of the annular wall portion 44 in a direction toward the cutting disc and beyond the periphery thereof. The longitudinally outer end of the periphery of the shield portion 50 is connected with the periphery of an outer wall portion 52 which extends generally radially inwardly in covering relation with a substantial portion of the cutting disc 16. As best shown in FIG. 3, the outer wall portion 52 is generally in the form of a washer cut in half.

The adjustable depth gauge member 20 is preferably made of sheet metal although it too may be formed of plastic material if desired. In the preferred construction shown, the adjustable depth gauge member 20 includes a generally planar gauge portion 54 having an elongated opening 56 therein of a size to permit a segment of the cutting disc 16 to pass therethrough. The depth gauge member 20 also includes an attaching portion 58 of generally U-shaped configuration extending at generally right angles from the gauge portion 54. The legs of the attaching portion are formed with parallel slots 60 for receiving therethrough a pair of threaded elements or bolts 62 connected to the outer wall portion 52 of the shield structure and extending longitudinally outwardly therefrom in parallel relation to one another. The attaching portion 58 of the adjustable depth gauge member is fixedly secured to the bolts 62 by suitable wing nuts 64 and washers 66. The portion at which the bolts 62 engage within the slots 60 determines the extent to which the cutting disc 16 extends through the opening 56 in the gauge portion 54 of the depth gauge member.

To facilitate the adjustment of the depth gauge member 20 with respect to the smooth peripheral cutting edge of the cutting disc 16, the outwardly facing surface of the attaching portion 58 is formed with a series of parallel lines 68 which are scribed or impressed therein. The lines are used in adjusting the gauge member 20 so as to permit the latter to be raised or lowered an equal amount at each wing nut fastener. By so doing the position of the gauge portion 54 relative to the operator's hand is maintained in a more natural potentially less fatiguing safer relation.

The tool 10 is conventionally used to remove the clamped U-bolts of tubing connections of automobile exhaust systems by the user simply gripping the housing 22 in one hand so that the actuating handle 34 extends in a position generally beneath the thumb of the gripped hand. The finger guard portion 48 of the protective shield 18 serves to prevent the user from skinning his knuckles during his use of the tool. When the tool is gripped in the manner indicated, the operator can, by simply squeezing the grip, move handle 34 downwardly to communicate the air under pressure with the rotor and commence the power operated rotary movement of the shaft 40 and thin cutting disc 16 fixed thereto. By guiding the segment of the cutting disc extending through the opening 56 in the depth gauge member into engagement with the portion of the metal parts which are to be cut, a rapid and effective cutting action can be achieved.

The depth gauge is particularly suitable to determine the depth of cut for slitting the outer wall of a two-wall configuration, either tubing or paneling. The high operating rpm allows the disc to cut very fast and efficiently. For the intended cutting operations, the air motor 14 with the axial rotating shaft 40 is superior to an arrangement in which the motor extends at a right angle with respect to the rotating shaft. Such right angle shaft would place the cutting disc and operator in an awkward position to use the same.

The tool presents a highly desirable alternative to the use of gas torches or air chisels for safety reasons. The tool is light-weight and fast acting. The cutting action and versatility of the tool make it possible to replace the hazardous and messy operation of the gas cutting torch. It cuts bolts faster and with less effort than an air chisel. The tool is constructed with an extended rotating shaft 40 such that the disc 16 is at a safe distance from the housing 12 of the air motor and the operator's hand. The plastic guard serves three purposes. First, its clear transparency enables the operator to see through it. Second, it provides a cover between the cutting disc and the eyes of the user. Third, it provides for finger protection of the user. The position and configuration of the guard immediately alerts the user where the safe position is for his hand while operating the tool. The depth gauge 20 adds a unique dimension to the tool, in that it allows the user to pre-set the depth gauge to achieve a desired depth of cut.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A tool for use in cutting parts of automotive components, such as exhaust systems, shock absorber units and the like, to facilitate removal and replacement of said components, said tool comprising a portable housing of a size and shape to be manually gripped by a user, an air motor within said housing including an output shaft extending generally longitudinally outwardly of one end of said housing, manually actuated means for selectively communicating a source of air under pressure with said air motor to operate the same and rotatably drive said output shaft, a thin cutting disc fixed concentrically on said shaft longitudinally in spaced relation with respect to said housing, and a protective shield structure molded of transparent rigid plastic material, said shield structure including an annular wall portion fixed to said one end of said housing in longitudinally spaced relation from one side of said cutting disc, a finger guard portion extending longitudinally from said annular wall portion in a direction away from said cutting disc in generally parallel coextensive relation with said housing, a peripheral shield portion extending longitudinally from said annular wall portion in annularly spaced relation with respect to said finger guard portion in a direction toward said cutting disc beyond the periphery thereof in covering relation with a substantial peripheral portion thereof, and an outer wall portion extending generally radially inwardly from the longitudinally outward end of said peripheral shield portion in covering relation with a substantial face portion of said cutting disc.

2. A tool as disclosed in claim 1 wherein said thin cutting disc is formed of abrasive material and includes a smooth cutting periphery.

3. A tool as disclosed in claim 2 including an adjustable depth gauge member having a generally planar gauge portion formed with an elongated opening of a size to permit a segment of the cutting disc to pass therethrough, an attaching portion extending from said gauge portion and means for fixedly securing said attaching portion to the outer wall portion of said shield structure in any one of a plurality of different positions wherein the size of the segment of the cutting disc extending through said gauge position opening is different.

4. A tool as disclosed in claim 3 wherein said fixedly securing means includes a pair of bolts fixed to said outer wall portion and extending longitudinally therefrom, said attaching portion including a pair of parallel slots receiving said bolts, a series of parallel depth indicia lines perpendicular to said slots, and wing nuts on said bolts in tightened relation with respect to said attaching portion.

5. A tool as disclosed in claim 2 wherein said manually actuated means comprises a trigger movably mounted on a housing.

6. A tool as disclosed in claim 5 wherein said trigger is pivoted to the end of said housing opposite said one end thereof and extends longitudinally toward said one end in spaced relation to the periphery of said housing at a position diametrically opposed to said finger guard portion.

7. A tool as disclosed in claim 1, 2, 3, 4, 5, or 6 wherein said plastic material is Bisphenol-A polycarbonate.

8. A tool as defined in claim 7 wherein said peripheral shield is of generally semi-cylindrical configuration.

* * * * *